United States Patent [19]
Hadzimahalis

[11] 3,965,529
[45] June 29, 1976

[54] MOLDED CONTROL KNOB
[75] Inventor: Theodore M. Hadzimahalis, Libertyville, Ill.
[73] Assignee: Bell & Howell Company, Chicago, Ill.
[22] Filed: Jan. 9, 1975
[21] Appl. No.: 539,834

[52] U.S. Cl. ................................ 16/121; 403/361
[51] Int. Cl.² ........................................... F16D 1/06
[58] Field of Search .............. 16/118, 121; 74/553; 292/349, 353; 403/361, 329, 383

[56] References Cited
UNITED STATES PATENTS

| | | | |
|---|---|---|---|
| 2,252,855 | 8/1941 | Lasch | 292/353 |
| 3,386,127 | 6/1968 | Hitzeroth et al. | 16/121 |
| 3,415,472 | 12/1968 | Vodinh | 403/361 X |
| 3,679,252 | 7/1972 | Howie | 292/349 |

Primary Examiner—Andrew V. Kundrat
Attorney, Agent, or Firm—Roger M. Fitz-Gerald; John R. Hoffman

[57] ABSTRACT

A unitarily molded control knob for an irregularly shaped rotatable shaft, such as a D-shaft. The knob has a molded flat floor which engages the flat of the D-shaft, and two opposed arcuately concave side walls which engage the opposite arcuately convex sides of the D-shaft adjacent the flat. A resiliently flexible cantilever arm is spaced opposite from the flat floor and biases the shaft tightly against the flat floor as the shaft is inserted axially therebetween. A major length of the underside of the cantilever arm is arcuately concave to mate with the area of the D-shaft opposite the flat and terminates in a flat area on the free end of the cantilever arm to distribute the pressure on the D-shaft and to develop a more positive gripping action with better holding capabilities.

11 Claims, 7 Drawing Figures

U.S. Patent   June 29, 1976   3,965,529
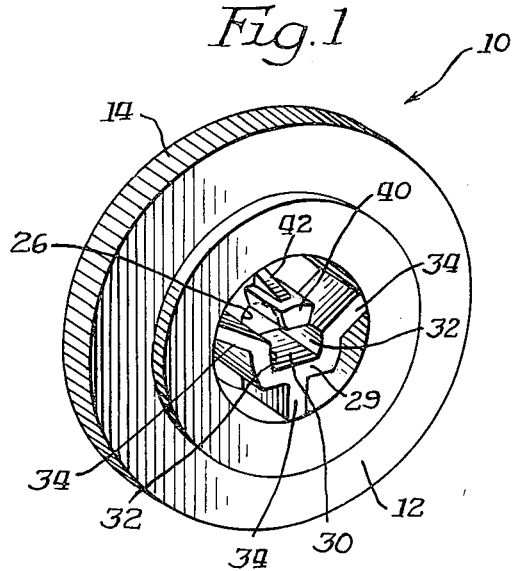
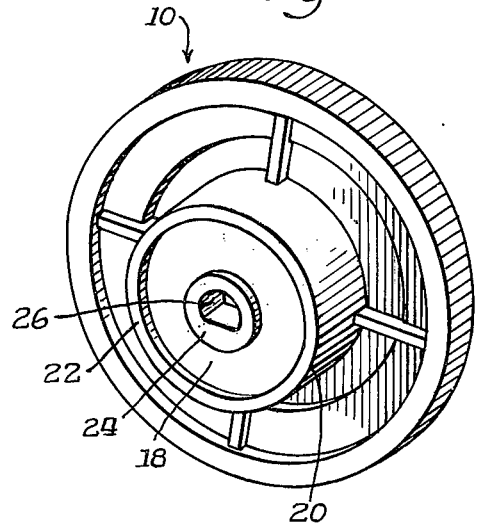
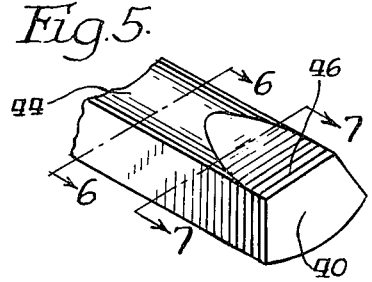
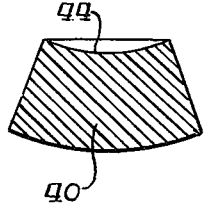
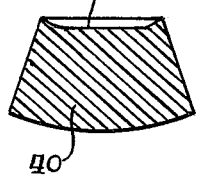
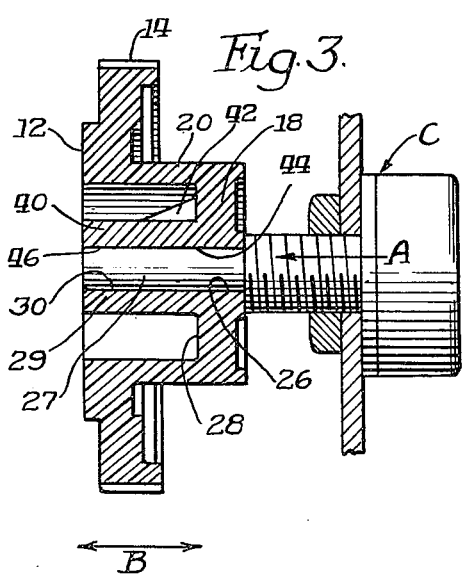
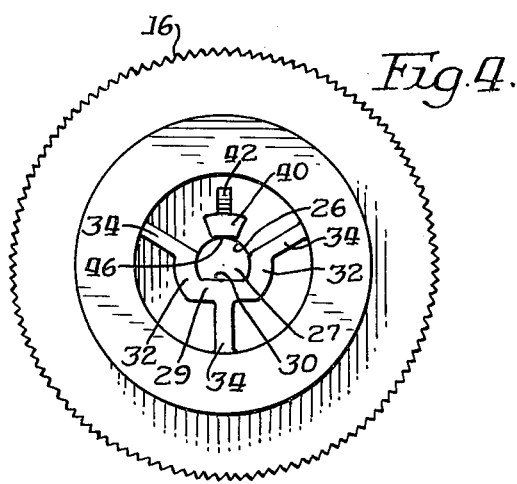

MOLDED CONTROL KNOB

BACKGROUND AND SUMMARY OF THE INVENTION

This invention relates to control knobs for irregularly shaped rotatable shafts, and more particularly relates to knobs for electrical controls having rotatable D-shafts.

Electrical or other controls, such as volume controls or switches which control various means in response to rotation of the control shaft, generally have a manually rotatable control knob on the end of the control shaft. It is often desirable to removably mount the knob on the end of the shaft while maintaining full rotational force fit between the knob and the shaft, as well as longitudinal friction fit. For example, when the knob is disposed on one side of a control panel and the control means is on the other side of the panel, it is necessary to remove the knob in order to remove the control panel.

The control knob preferably is removed axially off of the end of the shaft. Heretofore, the knob most often was held onto the shaft by a separate spring member, such as a metal leaf spring, which was mounted by other means in or around the aperture in the knob. The separate spring member also has been at times molded in position within the knob by providing a special molded cavity which receives and positions the spring member prior to molding the knob thereabout. The present invention obviates these multiple parts and multiple molding steps by providing a unitarily molded control knob which receives the control shaft and has a unitarily molded resilient cantilever arm which yieldably biases the control shaft against an opposing flat.

A flat in the receiving means of the knob engages the flat of the D-shaft to prevent relative rotation between the knob and the shaft, and the spring biasing of the cantilever arm between the knob and the shaft releasably holds the knob longitudinally onto the shaft.

While this invention is susceptible of embodiment in many different forms, it is shown in the drawings and will hereinafter be described in detail a specific embodiment thereof, with the understanding that the present disclosure is to be considered an exemplification of the principles of the invention and is not intended to limit the invention to the embodiment illustrated.

BRIEF DESCRIPTION OF THE DRAWINGS

FIG. 1 is a front perspective view of a form of the control knob in accordance with the present invention;

FIG. 2 is a rear perspective view of the knob of FIG. 1;

FIG. 3 is a vertical central section through the knob of FIGS. 1 and 2, showing the knob mounted on a D-shaft of an electrical control;

FIG. 4 is a front elevational view of the control knob mounted on the D-shaft;

FIG. 5 is a bottom perspective view, on an enlarged scale, of the cantilever arm;

FIG. 6 is a vertical section taken generally along the line 6—6 of FIG. 5; and

FIG. 7 is a vertical section taken generally along the line 7—7 of FIG. 5.

DESCRIPTION OF THE PREFERRED EMBODIMENT

It first should be pointed out that in the description and claims herein the use of the terms "floor", "top", "bottom", "front", "rear", etc., refer to the orientation of the control knob as shown in the drawings. It, of course, is obvious that the knob could be utilized in an infinite range of orientations or dispositions.

Referring first to FIGS. 1 and 2, a unitarily molded knob, generally designated 10, has a stepped, annular face plate 12 which is integrally molded with a cylindrical side wall 14. The side wall 14 includes a plurality of saw teeth 16 (FIG. 4) about the outer periphery thereof to facilitate easy manual gripping and rotation of the knob by a user. The knob 10 includes also an annular rear mounting abutment wall 18 which is molded integrally with the face plate by a second cylindrical wall 20 which is of smaller diameter but longer than the side wall 14. The rear wall 18 includes a raised flange 22 around the perimeter thereof and a smaller raised annular surface 24 generally in the center thereof. A D-shaped aperture 26 is provided in the rear wall 18 for slidably receiving a D-shaped shaft 27, for example of an electrical control, generally designated C in FIG. 3.

Referring again to FIGS. 1, 3 and 4, the aperture 26 terminates on the inside surface 28 of the rear wall 18. A unitarily molded longitudinal rib 29 inside the cylindrical wall 20 defines a generally flat floor 30 extending forwardly from the aperture 26 to the front face plate 12. A pair of longitudinally arcuately concave guide walls 32 are formed along and merge with the floor 30 for slidably receiving the D-shaft 27 on either side of the flat 30 as it is inserted through the aperture 26 in the direction of arrow A (FIG. 3). The side walls 32 and the rib 29 which forms the floor 30 are unitarily molded and supported within the cylindrical wall 20 by three unitary radial support ribs 34. The arcuate concave insides of the side walls 32 and the floor 30 contact the respective mating surfaces of the D-shaft 27 as the knob 10 is axially slid onto the D-shaft 27 and prevent relative rotation between the shaft and the knob.

A cantilever arm 40 is integrally molded with the wall 18 to extend forwardly thereof generally parallel to and diametrically opposite the flat floor 30 to engage the rounded portion of the D-shaft which is opposite the flat of the D-shaft. The cantilever arm 40 is slightly flexible and is strengthened by a triangular support flange 42 formed between the upper edge of the arm 40 and the inside surface 28 of the wall 18. The lower surface 44 of the cantilever arm 40 is arcuately concave in shape for substantially the entire length of the arm to mate with the top of the D-shaft opposite its flat, except for the free end portion of the cantilever arm near the face plate 12. At the free end of the cantilever arm, a flat surface 46 is provided on the underside thereof to engage the forwardmost end of the D-shaft and flex the cantilever arm 40 to bias the shaft into engagement with the flat floor 30.

As seen in FIG. 5, the flat 46 interrupts or spans the concave configuration of the lower surface 44 and is feathered into the concave lower surface of the cantilever arm 40. This area will contact the D-shaft and distribute the force applied on the D-shaft by the cantilever arm 40, as seen in FIG. 3. The end of the cantilever arm 40 will flex slightly upwardly. The amount of flexing can be changed by changing the length of the support flange 42. This arrangement provides for positive gripping action between the flat 46 on the end of the cantilever arm 40 and the D-shaft inserted therein while maintaining a slight degree of flexibility along the overall length of the shaft in engagement with the control knob 10. The shaft thus has better holding capabilities than those previously proposed while requiring no external set screws or springs to hold it in place. The control knob also is self-locating onto the D-shaft and will not loosen on the shaft when the control knob 10 is rotated by the user. The entire control knob is advantageously molded as a unitary or integral member. This can be accomplished in a single operation by a double acting mold separating in the direction of the double headed arrow B (FIG. 3).

The foregoing detailed description has been given for clearness of understanding only and no unnecessary limitations should be understood therefrom as some modifications will be obvious to those skilled in the art.

I claim:

1. A unitarily molded control knob for mounting a D-shaft of an electrical control or the like, comprising:
   a front face plate and a peripheral manual gripping portion;
   a hollow cylindrical hub portion including a rear wall extending rearwardly of said face plate to define a body portion; and
   an integrally molded D-shaft receiving means within said body, including a generally flat floor portion for engaging the flat of the D-shaft, side guide means for encapsulatingly engaging side portions of the D-shaft, said floor and guide means being supported within the body portion by a plurality of radially directed, longitudinally extending support flanges, and a flexibly resilient cantilever arm projecting from said rear wall and independent of said floor and guide means and spaced from and opposite said flat floor portion for engaging the D-shaft opposite its flat to bias the D-shaft against said floor portion and frictionally maintain the D-shaft longitudinally within the receiving means.

2. The control knob of claim 1 wherein said side guide means comprises a pair of upwardly extending, oppositely disposed side wall portions formed integrally with at least some of said support flanges at the inner ends thereof and extending longitudinally along said floor portion for engaging the sides of the D-shaft and to hold the D-shaft therebetween in engagement with said floor portion.

3. The control knob of claim 2 wherein the opposing faces of said side wall portions are arcuately concave for mating with the rounded sides of the D-shaft.

4. The control knob of claim 1 wherein said body includes a rear wall spaced from said face plate and said shaft receiving means includes a D-shaped aperture in said rear wall through which the D-shaft is inserted, said floor portion, said side guide means being formed integrally with said longitudinally extending support flanges and said cantilever arm extending forwardly of said rear wall from about said aperture and terminating generally in a flush relationship with the front of said face plate.

5. A unitarily molded control knob for mounting a D-shaft of an electrical control or the like, comprising:
   a body having a front face plate and a peripheral manual gripping portion; and
   an integrally molded D-shaft receiving means within said body, including a generally flat floor portion for engaging the flat of the D-shaft, side guide means for engaging the sides of the D-shaft, and a flexibly resilient cantilever arm spaced from and opposite said flat floor portion for engaging the D-shaft opposite its flat to bias the D-shaft against said floor portion and frictionally maintain the D-shaft longitudinally within the receiving means, the face of the cantilever arm on the inside of the free end thereof being feathered axially to a contrasting surface so as to provide an enlarged cross section to reduce the distance between the cantilever arm and said floor portion whereby engagement of the D-shaft with said area increases the biasing force on the D-shaft to thereby provide positive gripping action to increase the holding capabilities of the control knob on the D-shaft.

6. The control knob of claim 5 wherein the underside of said cantilever arm which faces said floor portion is arcuately concave in cross section for mating with the rounded surface of said D-shaft, and said area on the inside of the cantilever arm at its free end is defined by a flat spanning the concave underside of the cantilever arm.

7. The control knob of claim 6 wherein said flat on the underside of the free end of the cantilever arm is angularly disposed so as to merge with the concave surface thereof.

8. A unitarily molded control knob for mounting a D-shaft of an electrical control or the like, comprising:
   a front face plate, a peripheral manual gripping portion, an integrally molded hollow cylindrical hub portion extending rearwardly of said face plate defining a body portion, a rear wall spaced from and molded integrally with said body portion, and a D-shaped aperture in said rear wall through which the D-shaft is inserted and
   an integrally molded D-shaft receiving means within said body, including a generally flat floor portion molded integrally with said rear wall and extending forwardly thereof adjacent the flat of said D-shaped aperture for engagement with the flat of the D-shaft, a pair of upwardly extending, oppositely disposed side wall portions formed integrally with and extending longitudinally along said floor portion, the opposing faces of said side wall portions being arcuately concave for mating with the rounded sides of the D-shaft, said floor and side wall portions being strengthened by a plurality of radially directed support flanges formed integrally with said cylindrical hub, and a flexibly resilient cantilever arm spaced from and opposite said flat floor portion and extending forwardly from said rear wall independent of said side wall portions and adjacent said D-shaped aperture for engaging the D-shaft opposite its flat to bias the D-shaft against said floor portion and frictionally maintain the D-shaft longitudinally within the receiving means.

9. The control knob of claim 8 wherein the underside of said cantilever arm which faces said floor portion is arcuately concave in cross section for mating with the rounded surface of said D-shaft, and said area on the inside of the cantilever arm at its free end is defined by a flat spanning the concave underside of the cantilever arm.

10. The control knob of claim 9 wherein said flat on the underside of the free end of the cantilever arm is angularly disposed so as to merge with the concave surface thereof.

11. A unitarily molded control knob for mounting on a D-shaft of an electrical control or the like, comprising:
a body having a front face plate, a peripheral manual gripping portion, and a rear wall spaced from said face plate including a D-shaped aperture in said rear wall through which the D-shaft is inserted; and
an integrally molded D-shaft receiving means extending forwardly of said rear wall about said D-shaped aperture, including a generally flat floor portion for engaging the flat of the D-shaft, a pair of upwardly extending, arcuately concave, oppositely disposed side wall portions formed integrally with and extending longitudinally along said floor portion for mating with the rounded sides of the D-shaft, a flexibly resilient cantilever arm spaced from and opposite said flat floor portion for engaging the D-shaft opposite its flat to bias the D-shaft against said floor portion and frictionally maintain the D-shaft longitudinally within the receiving means, and a support rib molded integrally with said cantilever arm and said rear wall at the juncture thereof.

* * * * *